United States Patent
Olson

(10) Patent No.: US 11,022,477 B2
(45) Date of Patent: Jun. 1, 2021

(54) LIQUID TANK LEVEL MEASUREMENT

(71) Applicant: Bell Helicopter Textron Inc., Fort Worth, TX (US)

(72) Inventor: Eric Stephen Olson, Fort Worth, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 136 days.

(21) Appl. No.: 16/213,575

(22) Filed: Dec. 7, 2018

(65) Prior Publication Data

US 2020/0182679 A1 Jun. 11, 2020

(51) Int. Cl.
G01F 23/296 (2006.01)

(52) U.S. Cl.
CPC ........ *G01F 23/296* (2013.01); *G01F 23/2966* (2013.01)

(58) Field of Classification Search
CPC ............... G01F 23/296; G01F 23/2966; G01F 23/2961; G01F 23/0007; B64D 37/02
See application file for complete search history.

(56) References Cited

U.S. PATENT DOCUMENTS

| | | | |
|---|---|---|---|
| 5,035,140 A * | 7/1991 | Daniels | B08B 3/12 73/290 V |
| 9,631,967 B2 | 4/2017 | Venter | |
| 2003/0015036 A1* | 1/2003 | Young | G01F 23/2966 73/579 |
| 2008/0271516 A1* | 11/2008 | Hewitt | G01F 25/0061 73/1.73 |
| 2009/0282910 A1* | 11/2009 | Song | G01F 23/296 73/290 V |
| 2017/0284535 A1* | 10/2017 | Ehinger | B64C 27/06 |
| 2018/0044159 A1* | 2/2018 | Crouse | F17C 13/021 |
| 2018/0045367 A1 | 2/2018 | Raimarckers et al. | |
| 2018/0087420 A1 | 3/2018 | Poster | |
| 2018/0156654 A1 | 6/2018 | Roux | |
| 2018/0321073 A1 | 11/2018 | Cleyet et al. | |

* cited by examiner

*Primary Examiner* — Xin Y Zhong
(74) *Attorney, Agent, or Firm* — Shackelford, Bowen, McKinley & Norton, LLP

(57) ABSTRACT

An exemplary liquid tank level measurement system includes a tank having a wall, an accelerometer attached to the wall and configured to measure a vibration in the wall, and an instrument electronically connected to the accelerometer, the instrument configured to communicate a liquid level condition responsive to a vibration measurement received from the accelerometer.

14 Claims, 8 Drawing Sheets

LIQUID TANK LEVEL MEASUREMENT

TECHNICAL FIELD

This disclosure relates in general to the field of liquid tank level measurement, and more particularly to liquid tank level measurements in aircraft.

BACKGROUND

This section provides background information to facilitate a better understanding of the various aspects of the disclosure. It should be understood that the statements in this section of this document are to be read in this light, and not as admissions of prior art.

Fluid systems are well known in the art for providing fluid to working elements such as aircraft ailerons, gearboxes, bearings, tractor arms, and other similar devices. There exists a wide variety of fluid systems, including lubrication systems configured for effectively reducing heat and wear created between intermeshing parts. Fluid systems share a common feature, namely, fluid systems typically include a reservoir for storing a fluid, a drive subsystem for providing pressure to the fluid, and a plurality of conduits for channeling the fluid from the reservoir to a working element.

Some fluid systems are subject to extensive wear and exposed to hostile environments. For example, components for a tractor-arm hydraulic system could easily be damaged by the harsh environment associated therewith. In some fluid systems, damage to system's components could lead to catastrophic results. For example, a lubrication system in fluid communication with an aircraft gearbox could malfunction while the aircraft is in flight, resulting in the gearbox losing torque and the aircraft becoming inoperable.

Although the foregoing developments represent great strides in the area of fluid systems, many shortcomings remain.

SUMMARY

An exemplary liquid tank level measurement system includes a tank having a wall, an accelerometer attached to the wall and configured to measure a vibration in the wall, and an instrument electronically connected to the accelerometer, the instrument configured to communicate a liquid level condition responsive to a vibration measurement received from the accelerometer.

An exemplary aircraft includes a tank having a wall, an accelerometer attached to the wall and configured to measure a vibration in the wall, and an instrument electronically connected to the accelerometer, the instrument configured to communicate a liquid level condition responsive to a vibration measurement received from the accelerometer.

An exemplary method includes measuring, with an accelerometer, vibration in a wall of a tank located with an aircraft; and communicating a liquid level condition in the tank in response to the measuring. The measuring may occur in response to a forced vibration.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
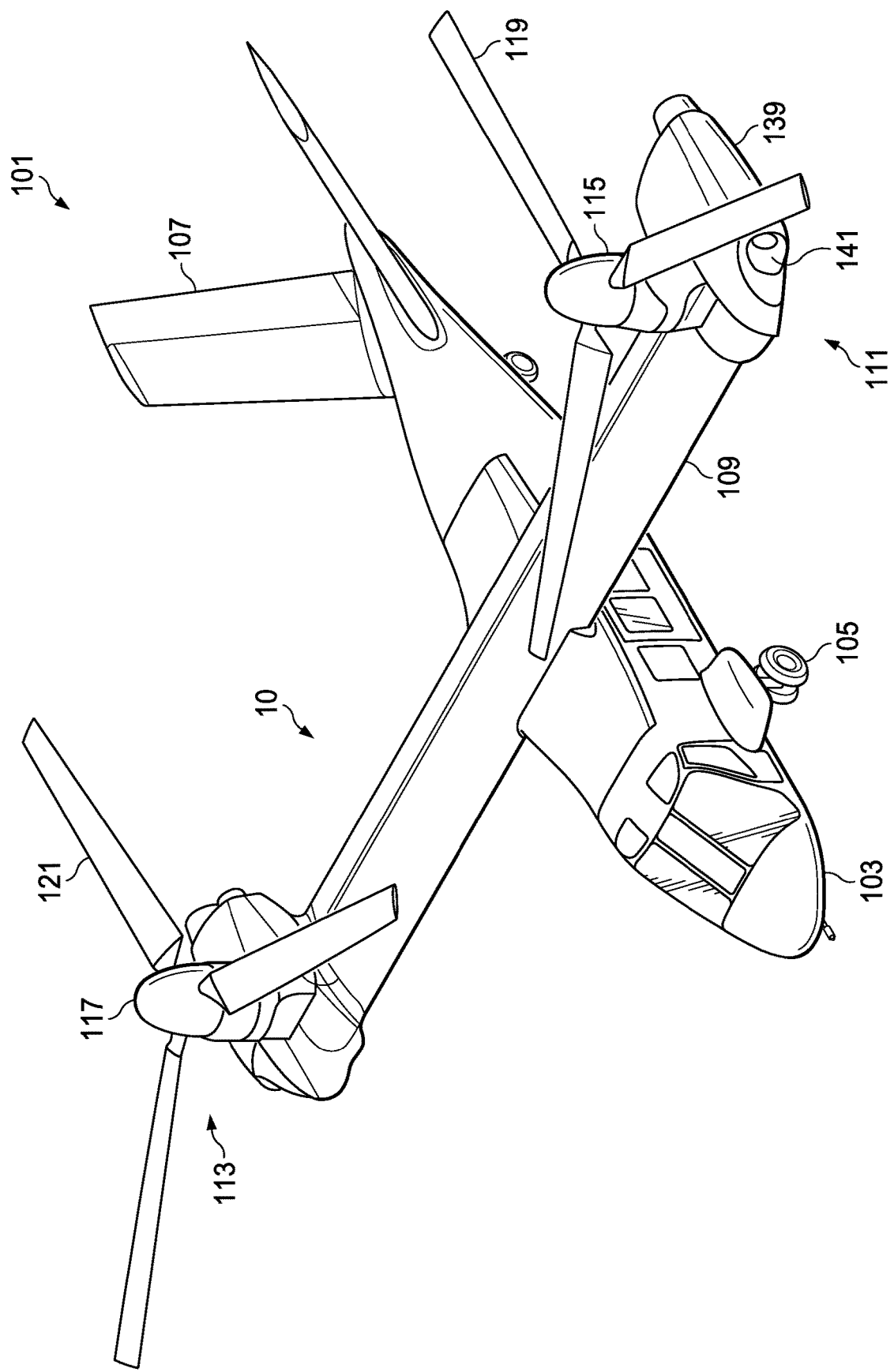
FIGS. 1 and 2 illustrate an exemplary aircraft incorporating a liquid tank level measurement system according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Figure 2:
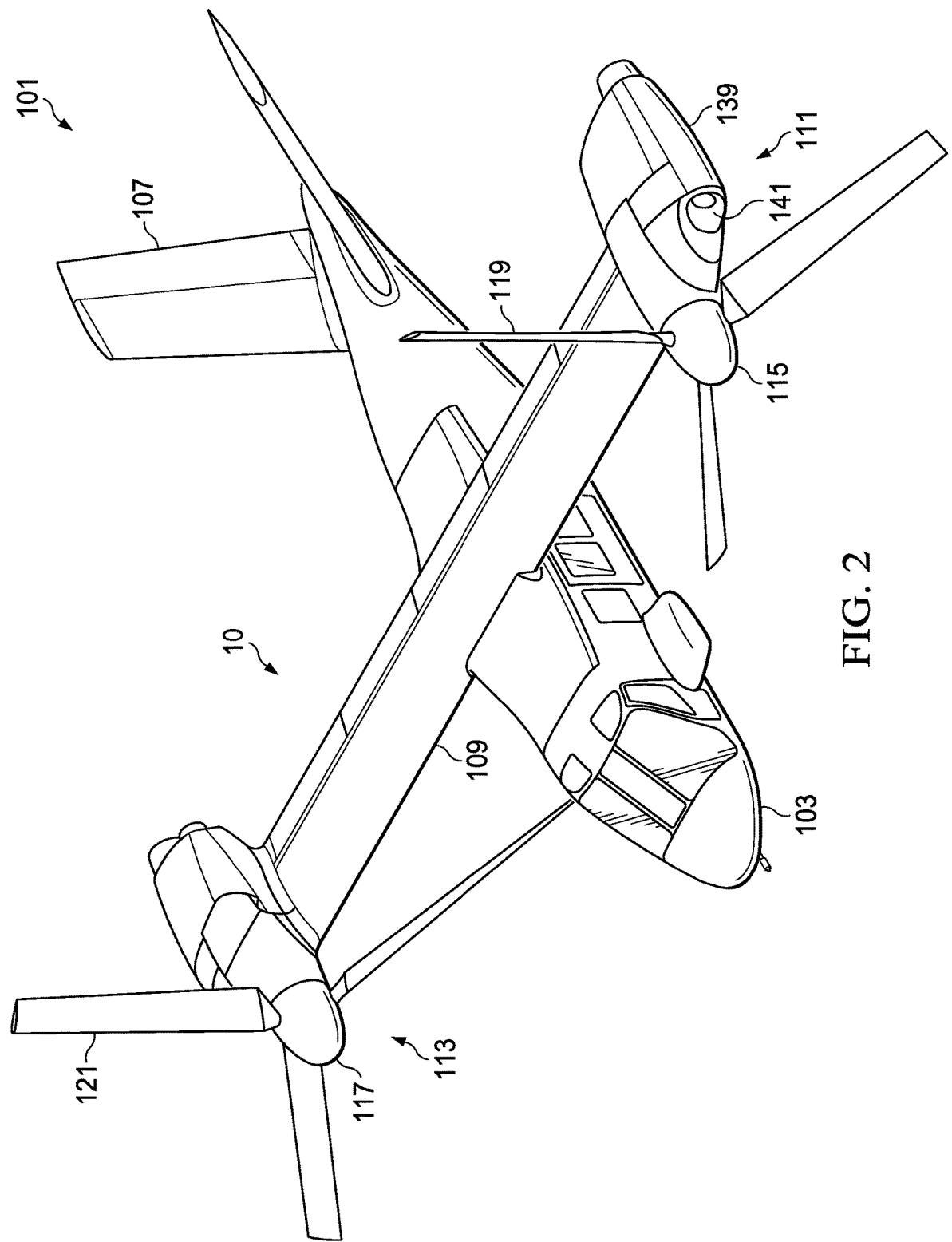

FIGS. 1 and 2 illustrate an exemplary aircraft 101 in incorporating a liquid tank level measurement system 10. Aircraft 101 is illustrated as a tiltrotor vertical takeoff and landing (VTOL) aircraft, however, aircraft 101 is not limited to tiltrotor and/or VTOL aircraft. Aircraft 101 can include a fuselage 103, a landing gear 105, a tail member 107, a wing 109, a drive system 111, and a drive system 113. Each drive system 111 and 113 in the illustrated aircraft includes an engine 139 and a rotatable proprotor 115 and 117, respectively. Each rotatable proprotor 115 and 117 has a plurality of rotor blades 119 and 121, respectively, associated therewith. The position of proprotors 115 and 117 relative to wing 109, as well as the pitch of rotor blades 119 and 121, can selectively control direction, thrust, and lift of aircraft 101.

FIG. 1 illustrates aircraft 101 in helicopter mode, in which proprotors 115 and 117 are positioned vertically to provide a lifting thrust. FIG. 2 illustrates aircraft 101 in an airplane mode in which proprotors 115 and 117 are positioned substantially horizontal to provide a forward thrust in which a lifting force is supplied by wing 109. Aircraft 101 can be operated such that proprotors 115 and 117 are selectively positioned between airplane mode and helicopter mode, which can be referred to as a conversion mode.

Drive system 113 is substantially symmetric to the drive system 111; therefore, for sake of efficiency, certain features will be disclosed only with regard to drive system 111. One of ordinary skill in the art will fully appreciate an understanding of drive system 113 based upon the disclosure herein of drive system 111.

Further, drive systems 111 and 113 are illustrated in the context of a tiltrotor aircraft 101; however, drive systems 111 and 113 can be implemented on other aircraft. For example, an alternative embodiment may include a quad tiltrotor that has an additional wing member aft of wing 109; the additional wing member can have additional drive systems similar to drive systems 111 and 113. In another embodiment, drive systems 111 and 113 can be used with an unmanned version of tiltrotor aircraft 101. Further, drive systems 111 and 113 can be integrated into a variety of tiltrotor aircraft configurations. Additionally, other drive systems are contemplated. For example, one example is a gearbox arrangement to provide torque to a rotor system of a helicopter.

Figure 3:
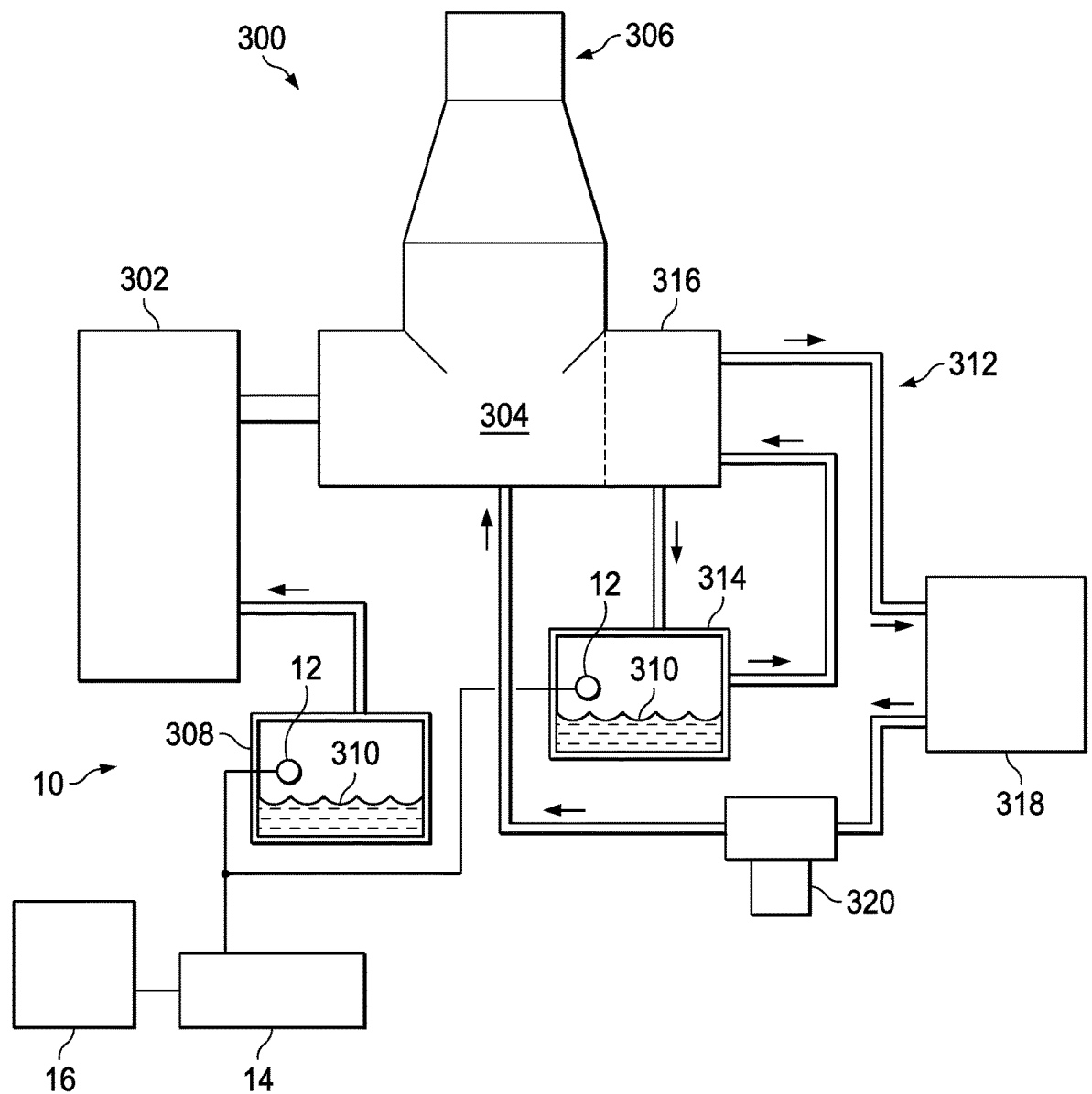
FIG. 3 is a schematic illustration of an exemplary aircraft drive system incorporating an exemplary liquid tank level measurement system.

FIG. 3 is a schematic illustration of an exemplary embodiment of an aircraft drive system 300 incorporating a liquid tank level measurement system 10. Drive system 300 includes an engine 302 connected to a gearbox 304 to drive a rotor 306. Rotor 306 may be a propeller, a proprotor, a main rotor (e.g., helicopter), an anti-torque rotor, or a push propeller. An anti-torque rotor may include for example rotor blades, tail propellers, ducted tail rotors, and ducted fans mounted inside and/or outside the aircraft. A push propeller may be used for example to provide forward thrust in a cruise or transitional mode. A fuel tank 308 is in fluid communication with engine 302. Fuel tank 308 contains a liquid 310 fuel.

Drive system 300 includes a lubrication system 312 to provide a liquid 310 lubricant to components such as gearbox 304. Lubrication system 312 can include a lubricant tank 314, pump 316, heat exchanger 318, and filter 320. Tank 314 may be integral with the housing of gearbox 304.

In this embodiment, liquid tank level measurement system 10 includes a sensor 12, in the form of an accelerometer, in direct connection with fuel tank 308 and a sensor 12, in the form of an accelerometer, in direct connection with lubricant tank 314. Liquid tank level measurement system 10 may include one or more liquid tanks. In one example, liquid tank level measurement system 10 is only connected with a lubricant tank. Liquid tank level measurement system 10, illustrated in FIG. 3, includes a controller 14 electronically connected to the one or more accelerometers 12 and connected to an instrument 16 to communicate accelerometer data and therefore a liquid level condition to a pilot. Accelerometer 12 may include controller 14 and or controller 14 may be incorporated in instrument 16. Controller 14 may convert the measured vibration data, for example amplitude to a liquid level condition. For example, instrument 16 may communicate a liquid level condition in the tank for example as a percentage of being full or instrument 16 may a liquid level condition such as a low-level or a high-level in the tank. In at least one embodiment, liquid tank level measurement system 10 is configured to communicate a low-level warning for example to provide an advance warning of a loss of lubrication event and provide additional time to pilot the aircraft to safety.

Controller 14 may associate a fluid level with the vibration amplitude along an axis normal to the target structure (e.g., tank wall) based for example on the vibration dampening associated with the liquid level in the tank. In some embodiments, the liquid level may be determined by comparing the amplitude along the axis normal to the target structure to the amplitude level along a different axis. According to one embodiment, the liquid level in the tank is determined by a comparison of the vibration amplitude measured along the axis normal to target structure with the vibration amplitude along the vertical axis. Controller 14 may selectively collect vibration measurements for example corresponding to a forcing frequency associated with the aircraft. In a simplest form, accelerometer 12 may output measurement signals directly to instrument 16. Instrument 16 may convey data visually, audibly, and or by physical cueing. The visual interface may use graphical, textual, and numerical elements and the visual interface may illuminate, flash, change color, change content, appear, disappear, move or change location, or otherwise change in response to the state of the liquid level in the monitored tank. Instrument 16 may be located in the fuselage of the aircraft. In an unmanned aircraft, the liquid level condition may be communicated to an instrument at a remote pilot through telemetry. If the unmanned aircraft does not require a remote pilot, then the tank level condition may be processed directly by the aircraft system flying the unmanned aircraft.

Figure 4:
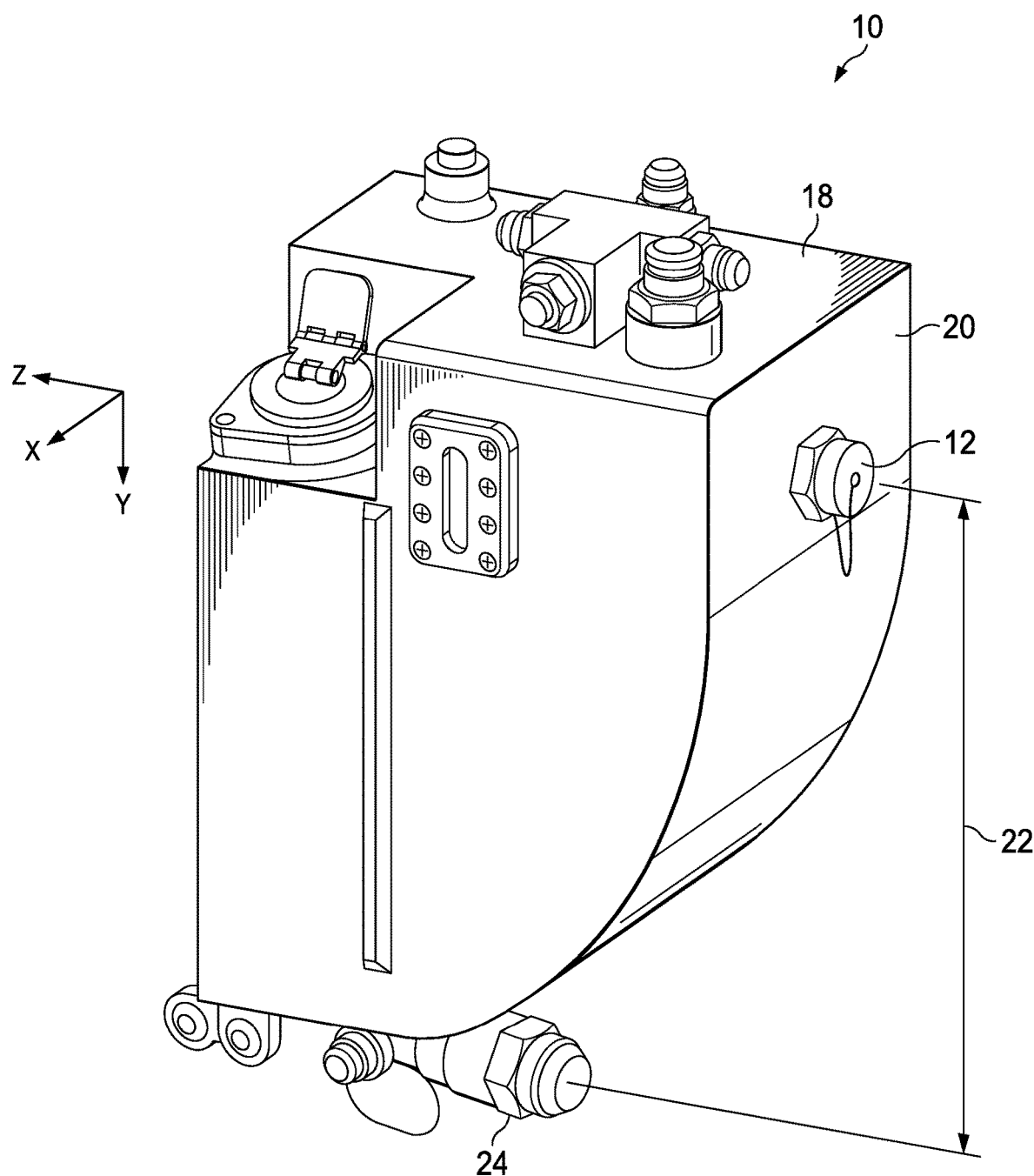
FIG. 4 illustrates an exemplary liquid tank level measurement system according to one or more aspects of the disclosure.

FIG. 4 illustrates an exemplary liquid tank level measurement system 10. System 10 includes an accelerometer physically connected to a liquid tank 18. In this embodiment, a single accelerometer 12 is connected to liquid tank 18. Accelerometer 12 is connected to a wall 20 of liquid tank 18 to measure the vibration of wall 20 of liquid tank 18. Accelerometer 12 may be connected directly to wall 20, e.g., the exterior of wall 20, via various mechanisms such as adhesives and stud mounts. In this embodiment, wall 20 extends vertically, however, accelerometer 12 may be attached to a wall that extends generally vertically (i.e., non-parallel to gravity) and in some embodiments wall 20 extends horizontally.

Accelerometer 12 may be a single axis, two-axis, or three-axis accelerometer. Accelerometer 12 is illustrated as a triaxial accelerometer measuring vibration along a horizontal X-axis, a vertical Y-axis, and a Z-axis normal to wall 20. In a single axis embodiment, accelerometer 12 may be configured to measure vibration for example along the Z-axis normal to wall 20. Accelerometer 12 may be electronically connected to the flight controller. The existing aircraft instruments and flight controller(s) may be configured to serve as controller 14 and instrument 16 depicted in FIG. 3.

Liquid tank level measurement system 10 may be an add-on system configured to be installed existing liquid tanks 18 that are installed in an aircraft. Accelerometer 12 can be attached directly to the outer surface of wall 20 at a desired height. For example, accelerometer 12 is positioned on wall 20 at a position 22 measured from a tank location 24. In this embodiment, tank location 24 corresponds to an outlet through which the contained liquid flows to an aircraft component. According to at least one embodiment, position 22 is located with a liquid tank at a low liquid level whereby accelerometer 12 and liquid tank level measurement system 10 will detect and communicate a low liquid level condition. In some embodiments, a liquid level condition is only communicated when the liquid level condition fails to meet a threshold such as a low-level threshold. In some embodiments, system 10 communicates an alarm signal when a threshold condition is not met or is exceeded. For example, system 10 may communicate an audible or visual alarm (e.g., flashing light, illuminating a light, changing a light color) when the liquid level condition is a low liquid level. In a single accelerometer embodiment, accelerometer 12 may be positioned near the highest expected liquid level for example to provide a range of measurements of the liquid level.

Figure 5:
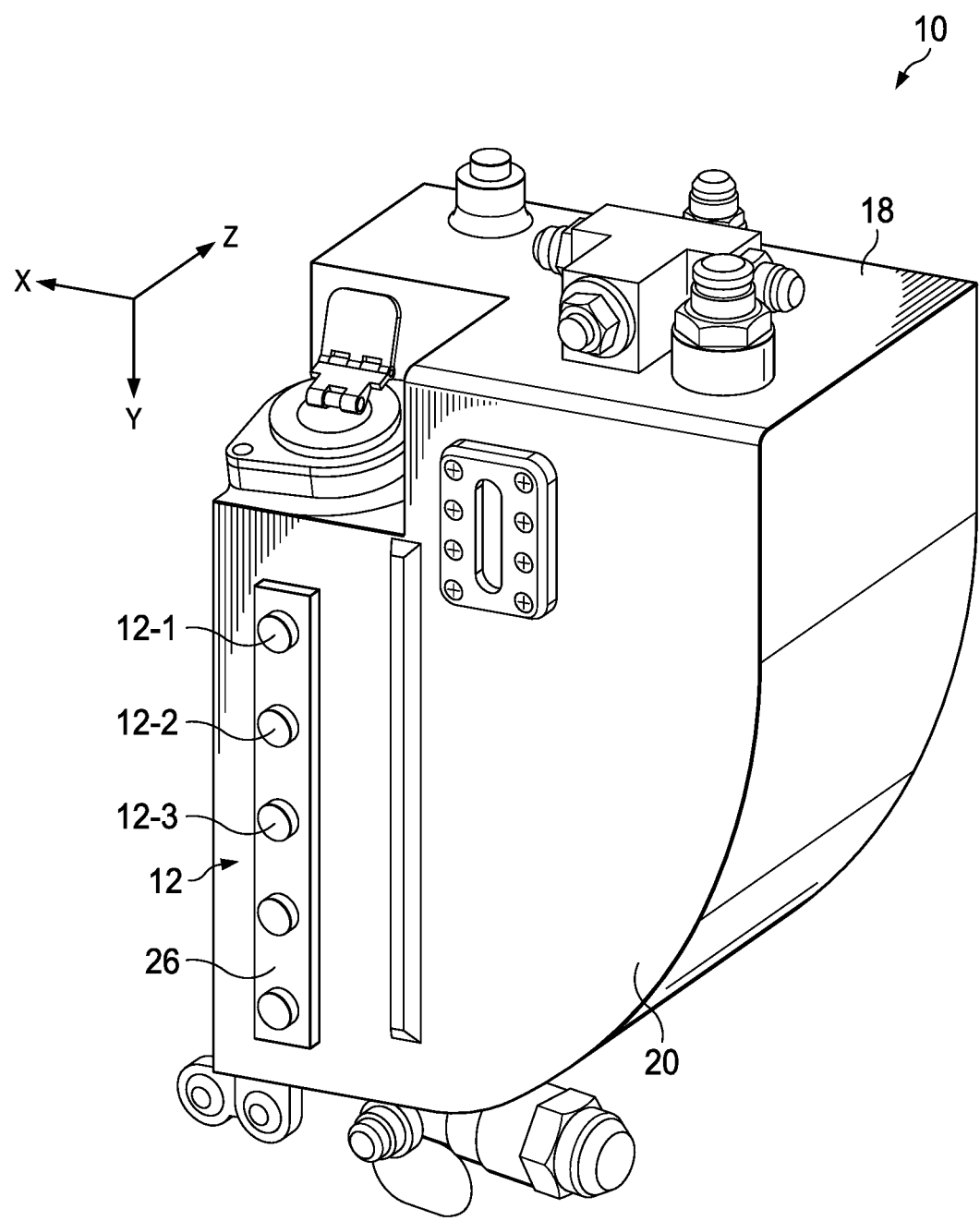
FIG. 5 illustrates another exemplary liquid tank level measurement system according to one or more aspects of the disclosure.
Figure 6B:
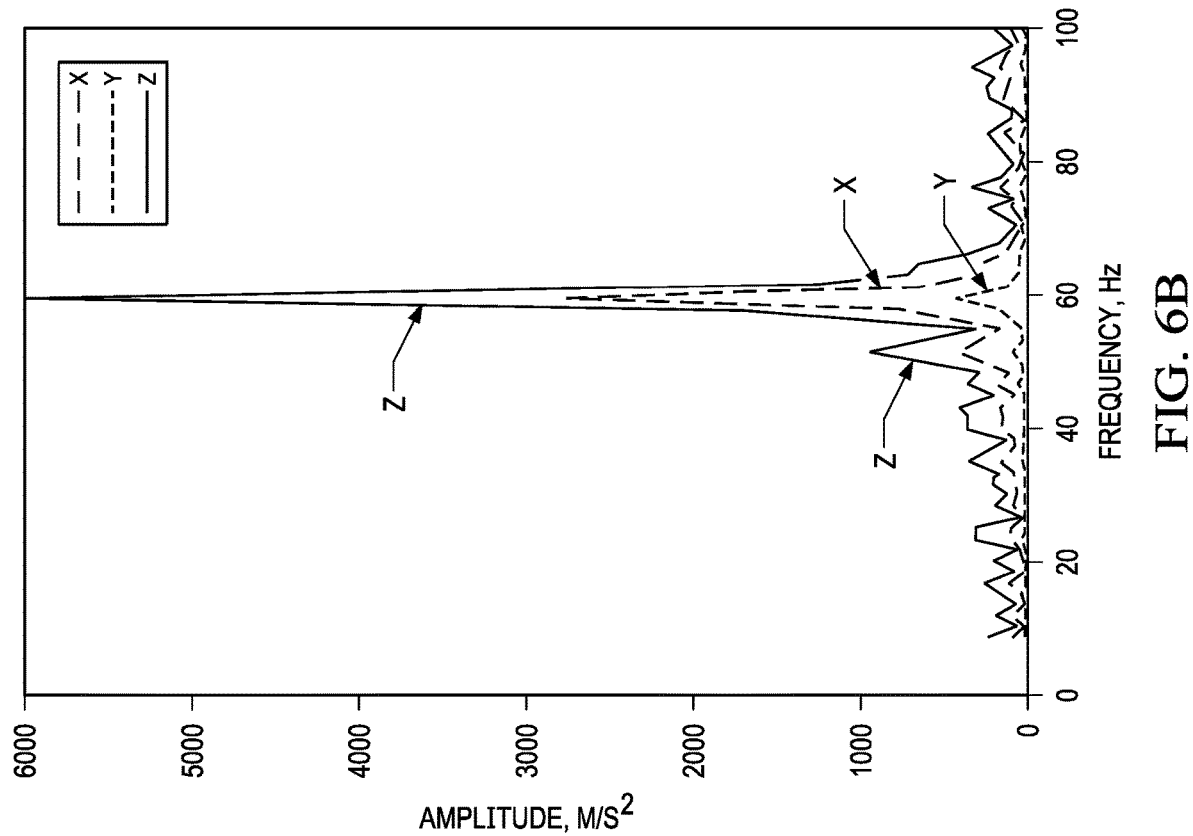
FIGS. 6A and 6B schematically illustrate an exemplary liquid tank level measurement system with a liquid level below the level of the measuring accelerometer.
Figure 6A:
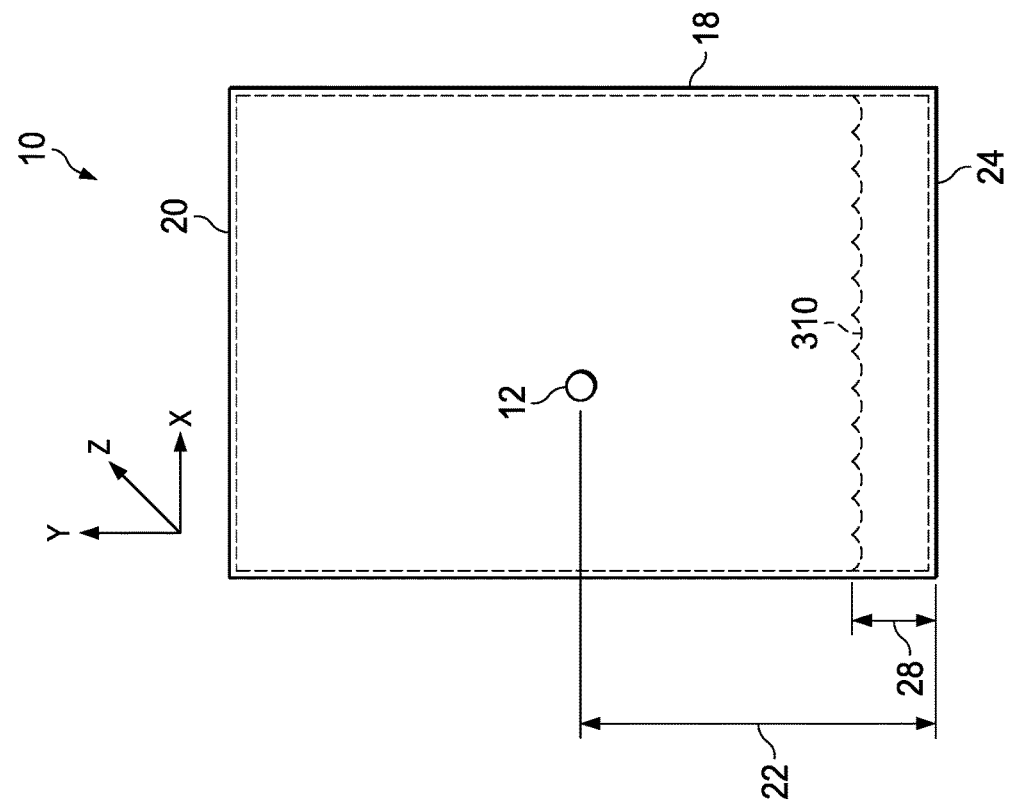

FIG. 5 illustrates another exemplary liquid tank level measurement system 10 incorporating two or more accelerometers 12, individually denoted 12-1, 12-2, 12-3, etc., separated vertically on wall 20. Multiple accelerometers 12 may be used to provide a more accurate measurement of the liquid level over a range of liquid levels. Accelerometers 12 are attached to wall 20 by a mount 26. Mount 26 is an adhesive in this embodiment. In some embodiments, accelerometers 12 are attached during manufacturing of tank 18 or prior to the installation of tank 18 in an aircraft. In some embodiments, liquid tank level measurement system 10 is an add-on system configured to be installed with existing aircraft and tanks. In an exemplary embodiment, one or more of the accelerometers 12 are located at threshold positions. For example, an accelerometer 12 may be located at a low liquid level threshold position and system 10 may be configured to communicate an alarm, such as an audible alarm or a visual alarm to alert the pilot when the liquid level does not meet the low-level threshold. A visual alarm may take various forms including illuminating a light or display, a flashing light or display, and/or a change in a light color, FIGS. 6A and 6B schematically illustrate an exemplary liquid tank level measurement system 10 with a liquid level below the level of accelerometer 12. Accelerometer 12 is positioned on wall 20 of tank 18 at a position 22 measured from a tank location 24. Tank 18 contains a liquid 310 having a liquid level 28 for example relative to tank reference location 24. In this example, liquid level 28 is below (lower vertically) than position 22 of accelerometer 12.

FIG. 6B illustrates a measurement taken by accelerometer 12 in FIG. 6A in response to a forced vibration. The forced vibration may be a continuous forced vibration such as a forcing frequency inherent for example in an operating aircraft, or an intentionally generated vibration in a non-operating aircraft, i.e., on the ground. In this example, the forced vibration is a forcing frequency that is inherent in an operating aircraft. In this example, accelerometer 12 is a triaxial sensor obtaining vibration measurements along a horizontal X-axis parallel with wall 20, a vertical Y-axis, and a Z-axis normal to wall 20. In this example, the absolute amplitude of the Z-axis measurement is indicative of liquid level 28 being below accelerometer level 22. The Z-axis amplitude is greater than the X-axis and the Y-axis amplitudes when liquid level 28 is below accelerometer level 22. In the illustrated examples, the greater the liquid level in the tank the greater the vibration amplitude is dampened. Comparatively, greater vibration dampening occurs along the Z-axis normal to the target structure, wall 20, than along the X-axis and the Y-axis. Liquid level 28 can be determined relative to accelerometer level 22 via a single axial measurement, e.g., Z-axis, or by a comparison of amplitudes of two or more of the axial measurements.

When the tank 18 is located on the ground and the aircraft is not operating, the tank level can alternately be obtained by measuring the natural frequencies of the tank. The natural frequencies response of the tank can be measured with a rap test. In a rap test the tank is struck exciting all the frequencies. After a short amount of time the tank will only resonate at the natural frequencies. These natural frequencies will change with oil level.

With additional reference particularly to FIG. 3, accelerometer 12 may communicate to an instrument 16. Instrument 16 may be located at one or more of the aircraft cockpit, the liquid tank, a flight computer, and a remote location. The instrument may communicate the data in various formats including as an indication that liquid level 28 is above or below a particular threshold level. Instrument 16 may communicate a relative condition of the liquid level such as illuminating a green light if liquid level 28 is at an acceptable level and a red light if liquid level 28 is below an acceptable level. In some embodiments, instrument 16 communicates an audible alarm if the measured liquid level 28 does not meet a threshold level.

Figure 7B:
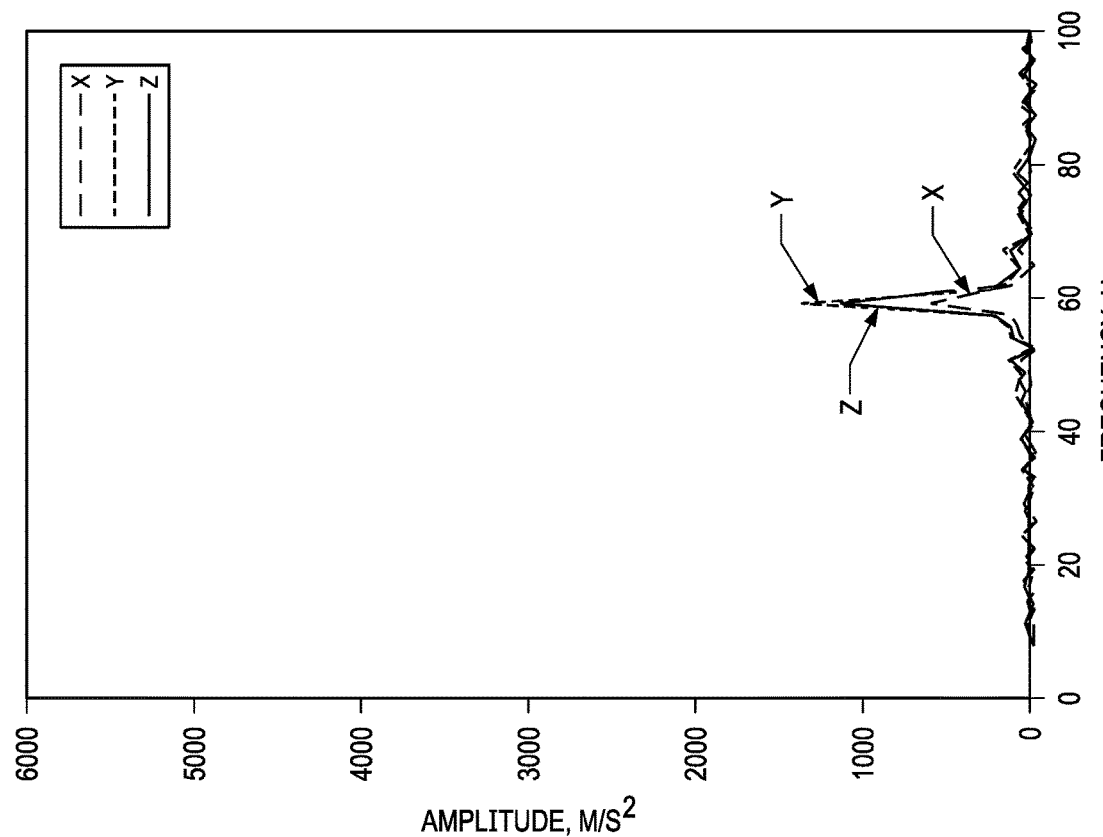
FIGS. 7A and 7B schematically illustrate an exemplary liquid tank level measurement system with a liquid level approximately level with the measuring accelerometer.
Figure 7A:
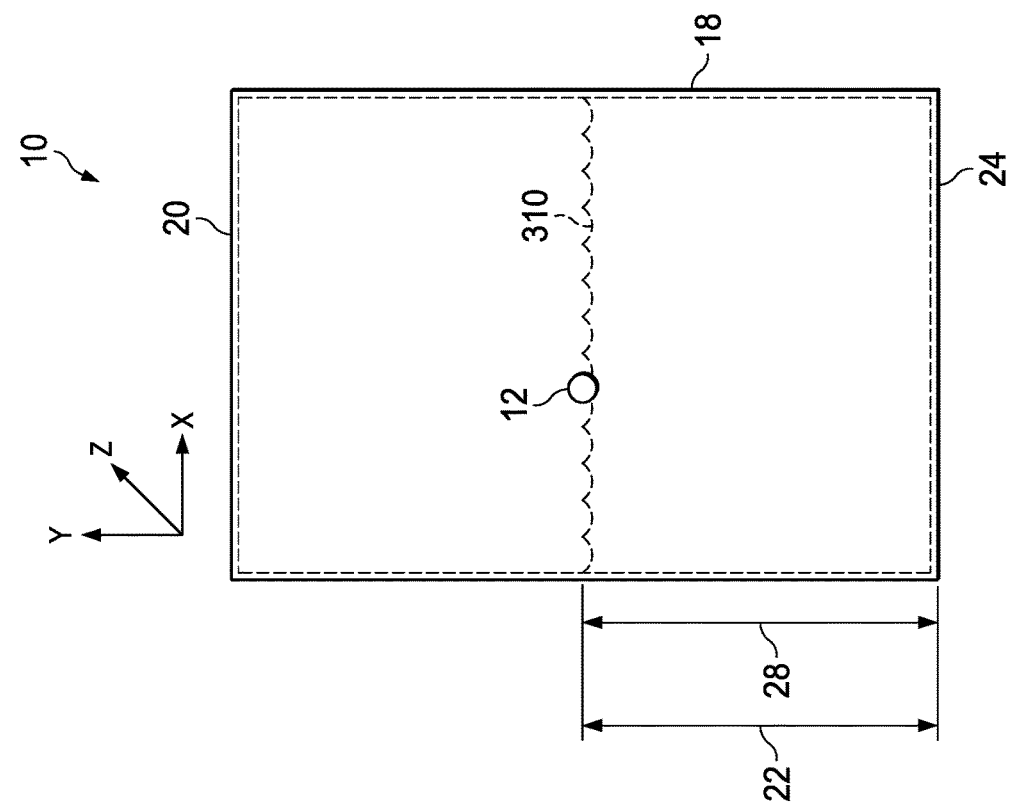

FIGS. 7A and 7B schematically illustrate an exemplary liquid tank level measurement system 10 with a liquid level 28 approximately level with a measuring accelerometer 12. Accelerometer 12 is positioned on wall 20 of tank 18 at a position 22 (accelerometer level) measured from a tank location 24. Tank 18 contains a liquid 310 having a liquid level 28 relative to tank reference location 24. In this example, liquid level 28 and measuring accelerometer level 22 are approximately equal.

FIG. 7B illustrates a measurement taken by accelerometer 12 in FIG. 7A in response to a forced vibration. The increased liquid level 28 dampens the vibration in tank wall, demonstrated for example by the absolute amplitude along the Z-axis normal to wall 20. Comparing the axial measurements in this example, the Z-axis amplitude and the Y-axis amplitude are relatively similar to one another when liquid level 28 and accelerometer level 22 are substantially equal.

Figure 8B:
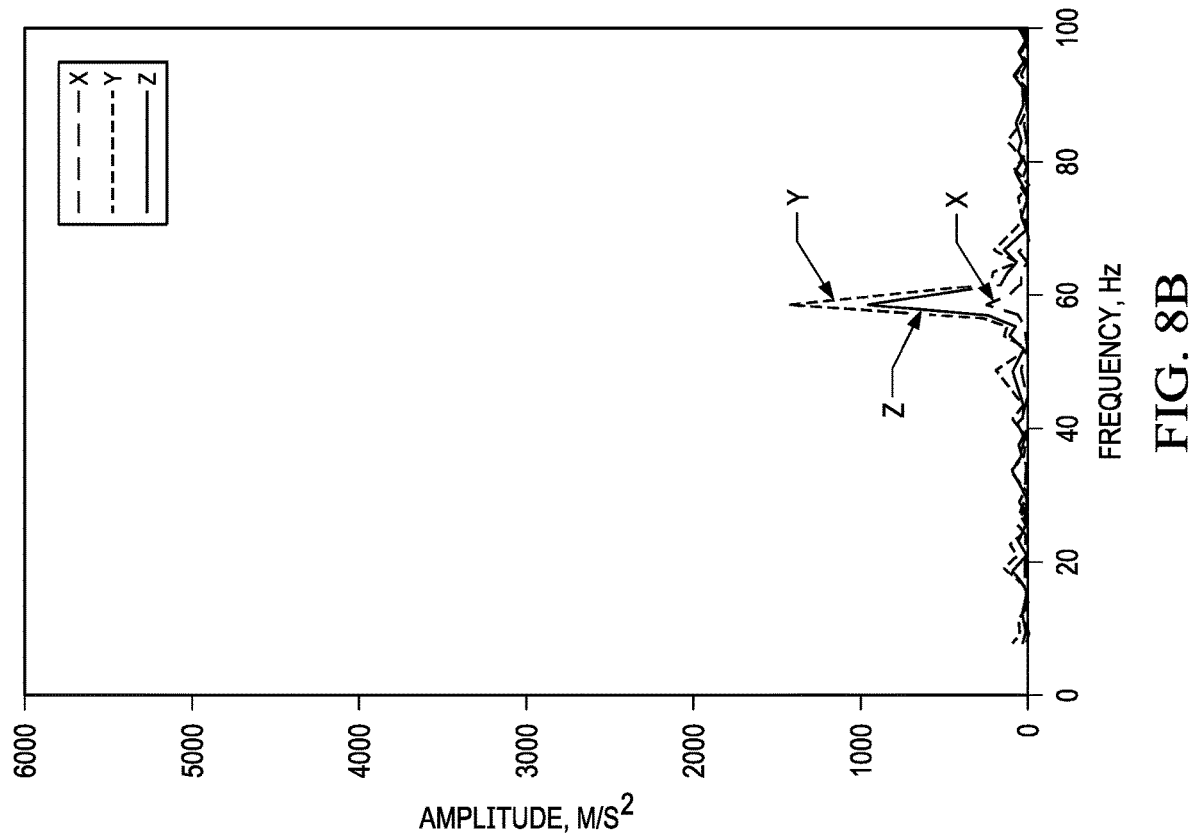
FIGS. 8A and 8B schematically illustrate an exemplary liquid tank level measurement system with a liquid level above the level of the measuring accelerometer.
Figure 8A:
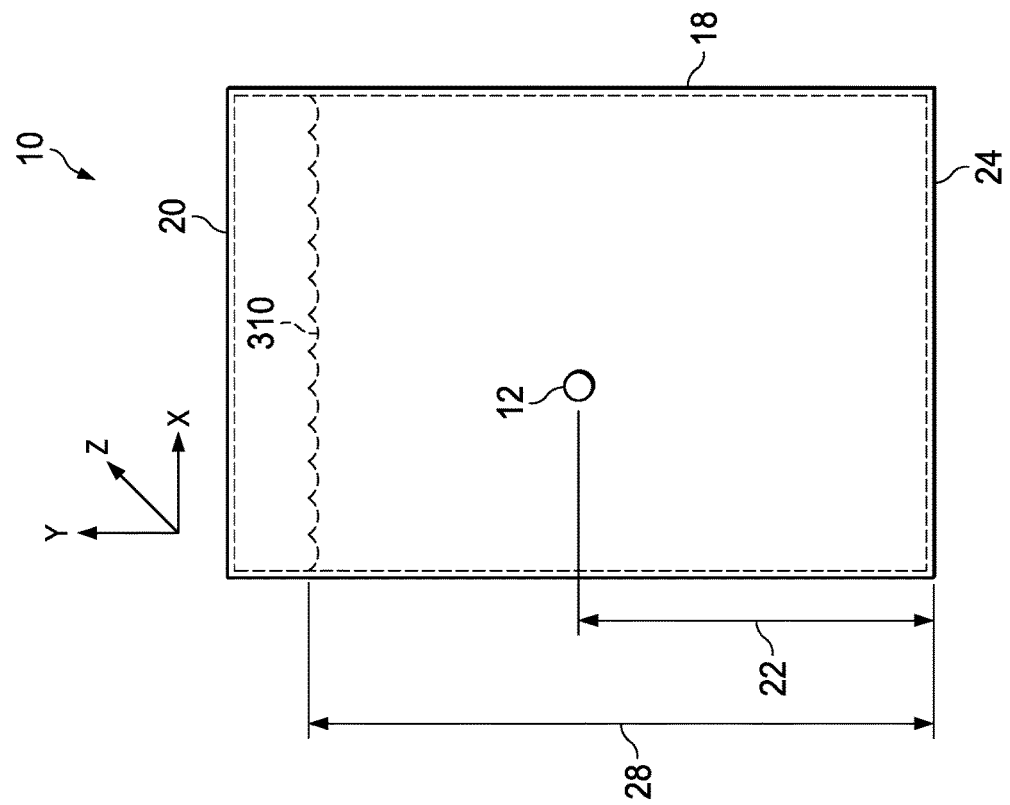

FIGS. 8A and 8B schematically illustrate an exemplary liquid tank level measurement system 10 with a liquid level 28 above the level of the measuring accelerometer. Accelerometer 12 is positioned on wall 20 of tank 18 at a position 22 (accelerometer level) measured from a tank location 24. Tank 18 contains a liquid 310 having a liquid level 28 relative to tank reference location 24. In this example, liquid level 28 is greater than measuring accelerometer level 22.

FIG. 8B illustrates a measurement taken by accelerometer 12 in FIG. 8A in response to a forced vibration. The increased liquid level 28 dampens the vibration in tank wall, demonstrated for example by the absolute amplitude along the Z-axis normal to wall 20. Comparing the axial measurements, the Z-axis amplitude is noticeably less than the Y-axis amplitude when liquid level 28 is greater than measuring accelerometer level 22.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard,"

"outboard, "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An aircraft, the aircraft comprising:
   an engine connected a gearbox to drive a rotor when the aircraft is operating, wherein the operating aircraft has an inherent forcing frequency;
   the gearbox comprising a tank;
   a lubricant in the tank;
   an accelerometer attached to a wall of the tank and operable to measure the inherent forcing frequency in the wall; and
   an instrument electronically connected to the accelerometer and operable to communicate a level of the lubricant in the tank responsive to a forcing frequency measurement received from the accelerometer.

2. The system of claim 1, wherein the instrument is operable to communicate an alarm when the lubricant level is below a threshold level.

3. The system of claim 2, wherein the alarm is an audible alarm.

4. The system of claim 1, wherein the vibration measurement is along an axis normal to the wall.

5. The system of claim 1, wherein the accelerometer consists of a single-axis accelerometer and the vibration measurement consists of a measurement along an axis normal to the wall.

6. The system of claim 1, wherein the vibration measurement comprises a measurement along more than one axis.

7. The aircraft of claim 1, wherein the accelerometer consists of a single-axis accelerometer.

8. The aircraft of claim 1, wherein the accelerometer comprises a plurality of vertically separated accelerometers.

9. A method, comprising:
   monitoring a lubricant level in an operating aircraft, the aircraft comprising an engine connected to a rotor through a gearbox, the gearbox comprising a lubricant tank;
   measuring, with an accelerometer, a continuous forcing frequency of the operating aircraft in a wall of the lubricant tank; and
   communicating the lubricant level in response to the measuring.

10. The method of claim 9, wherein the lubricant level is communicated to a flight computer.

11. The method of claim 9, wherein the accelerometer includes two or more vertically separated accelerometers.

12. The method of claim 9, wherein the communicating comprises communicating an alarm when the lubricant level is at or below a threshold level.

13. The method of claim 9, wherein the communicating consists of communicating the lubricant level when it is at or below a threshold level.

14. The method of claim 13, wherein the accelerometer includes two or more vertically separated accelerometers.

* * * * *